Oct. 24, 1967 R. L. McILVAINE 3,348,825
APPARATUS FOR COLLECTING CONTAMINANTS FROM GASES
Filed Feb. 3, 1966 2 Sheets-Sheet 1
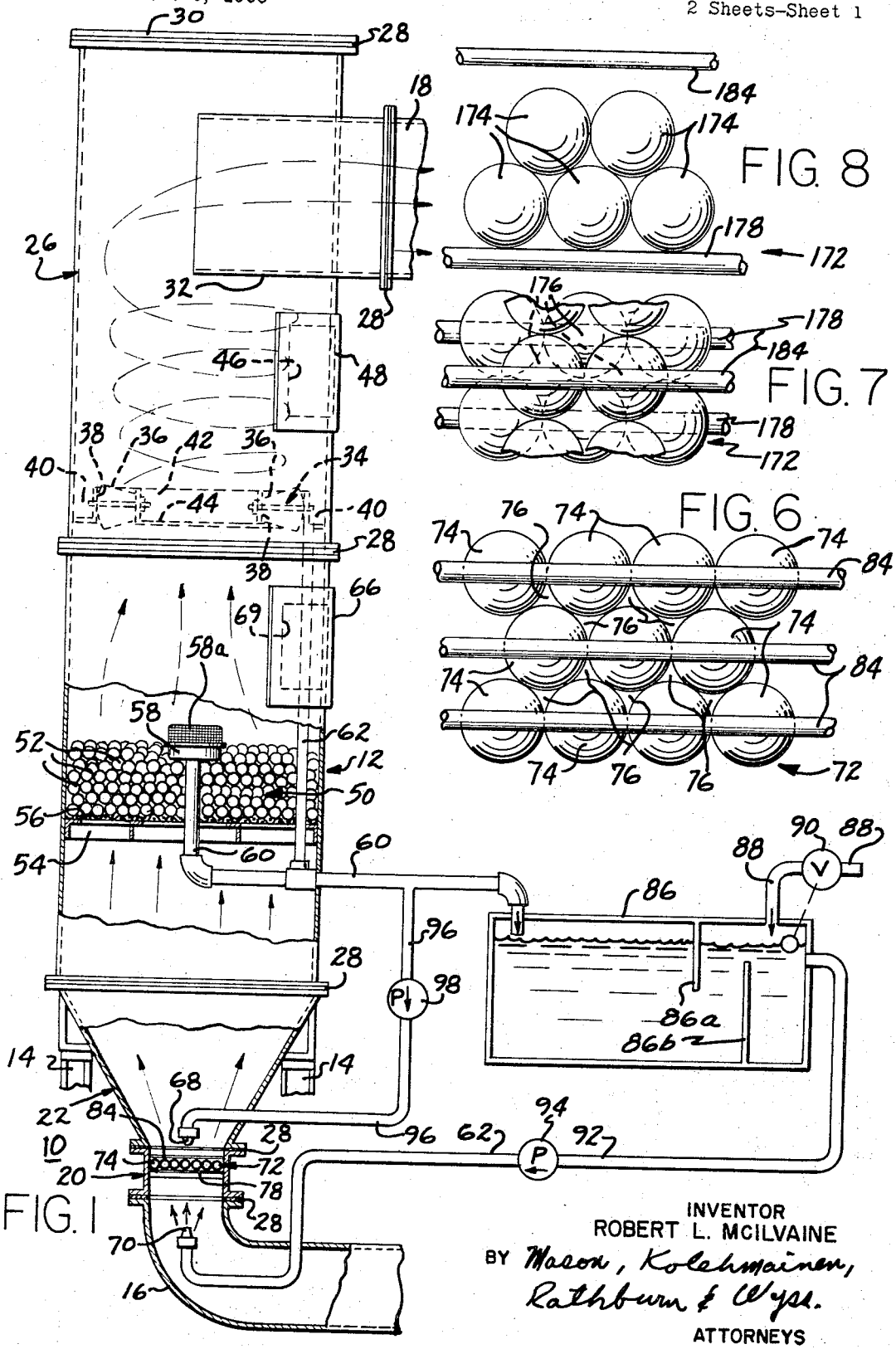
INVENTOR
ROBERT L. McILVAINE
BY Mason, Kolehmainen,
Rathburn & Wyss
ATTORNEYS

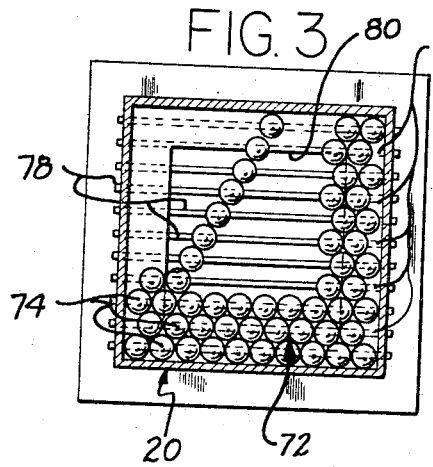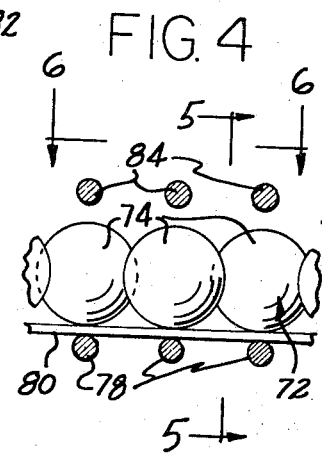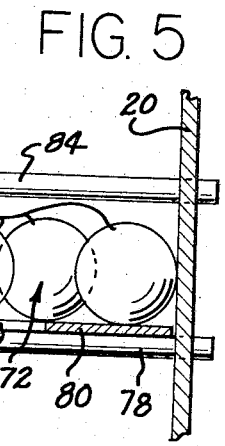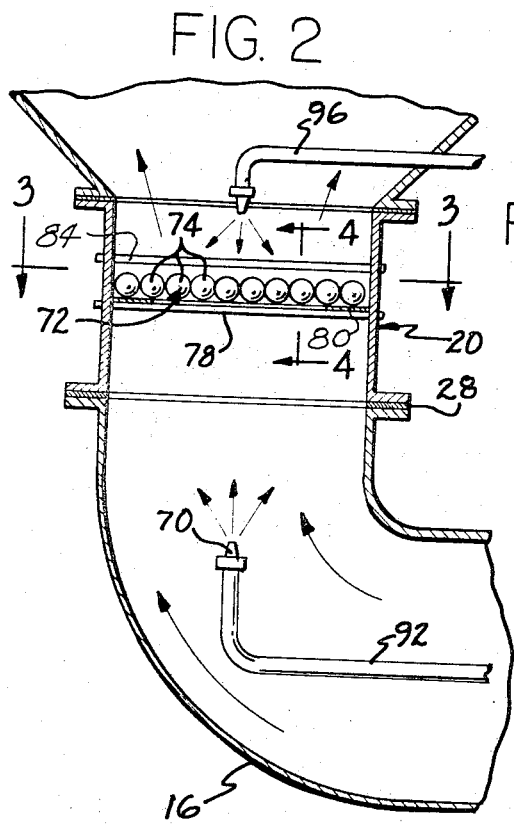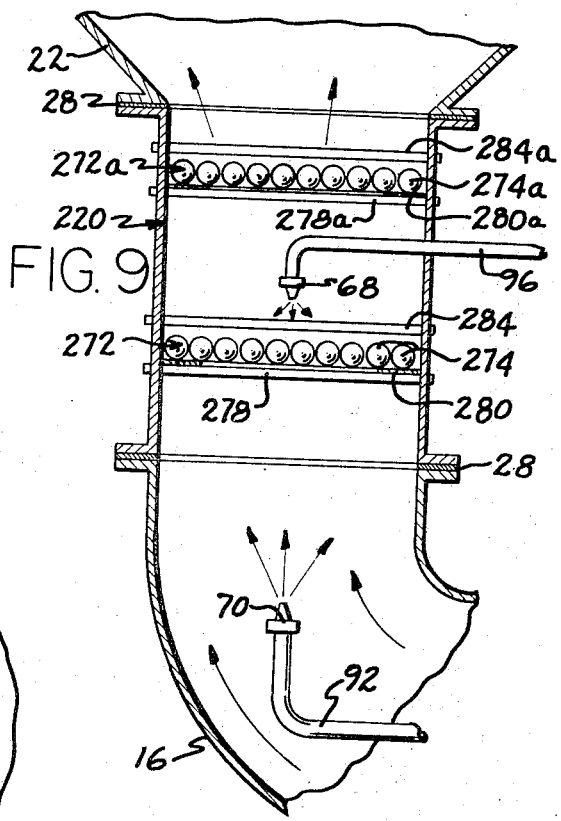

United States Patent Office 3,348,825
Patented Oct. 24, 1967

3,348,825
APPARATUS FOR COLLECTING CONTAMINANTS FROM GASES
Robert L. McIlvaine, Winnetka, Ill., assignor to National Dust Collector Corporation, Skokie, Ill., a corporation of Illinois
Filed Feb. 3, 1966, Ser. No. 524,945
8 Claims. (Cl. 261—98)

ABSTRACT OF THE DISCLOSURE

A dust collector for removing contaminants from gas including an upright housing, a filter bed extending transversely across the housing, and flow nozzle menas below the filter bed including a plurality of wetted spherical filter elements arranged in a single layer extending transversely across the nozzle and in side-by-side, freely rotatable tangential relationship and supported by a grid extending across the nozzle, and retained by a second grid provided above the layer and spaced slightly above the filter elements to permit them limited movement yet prevent any permanent displacement of the filter balls out of the layer.

---

The present invention relates to a new and improved apparatus for collecting contaminants from gases and, more particularly, relates to devices commonly termed as dust collectors which are used for collecting dust particles, fumes, and other impurities from air and flue gases, etc.

The present invention is directed towards a new and improved dust collector of the wet scrubber type which employs a liquid collecting medium, such as water, for entrapping and collecting the contaminants in the gas. One such wet scrubber type dust collector is shown and described in the copending patent application Ser. No. 503,463, filed Oct. 23, 1965, and assigned to the same assignee as the present invention, which constitutes an improvement thereon. One of the problems associated with wet scrubbers is that of obtaining a thorough and intimate mixing of the liquid collecting medium in the gas stream so that maximum collection efficiencies are obtained. Also, it is desirable to provide the highest possible liquid film surface area per volume of gas flow in order to obtain a maximum rate of transfer of the dust particles and impurities from the gas into the liquid collecting film.

The present invention provides a new and improved dust collector having means on the inlet side of the dust collector housing for prewetting the gas as it enters the housing while still moving at a high velocity. The prewetting action accomplished on the inlet side of the housing greatly increases the operating efficiency of the collector.

It is therefore an object of the present invention to provide a new and improved apparatus for removing contaminants from gas.

Another object of the present invention is to provide a new and improved dust collector having means for wetting the gases with a liquid collecting medium while the gases are moving at high velocity as they enter the dust collector housing.

Another object of the invention is the provision of a new and improved dust collector including means for wetting the incoming gases as they flow into the collector housing utilizing a plurality of self-cleaning, movable, filter elements to provide a large surface area for liquid film upon which the high velocity gases can directly impinge.

Yet another object of the present invention is the provision of a new and improved dust collector including means for wetting the gases as they enter the dust collector housing, which means includes a pair of spaced filter layers, each employing a plurality of self-cleaning filter elements and spray means for wetting the layers so that the gas flowing therethrough will become wetted as it enters the housing.

The foregoing and other objects and advantages of the present invention are accomplished by providing a wet scrubber type dust collector including an enlarged housing with a filter bed therein for entrapping and removing the contaminants from the gas by means of liquid collecting medium introduced into the filter bed. Incoming gas to be cleaned is directed at high velocity through an inlet flow nozzle or conduit for prewetting with the liquid collecting medium as it enters the dust collector housing. A plurality of spherical filter elements are arranged in a layer to extend transversely across the flow nozzle, and the filter elements in the layer are arranged to lie in a side-by-side, tangentially touching relation. The filter elements are freely rotatable in relation to each other and the voids or spaces between the elements form a multiplicity of small, diversely directed gas flow orifices. The filter elements are supported on a first grid means extending transversely across the flow nozzle, and a second grid means overlies the layer of filter elements and is spaced above the elements in order to limit the upward movement of the elements so they do not move on up into the dust collector housing. Spray means are provided for wetting the surfaces of the spherical filter elements in the flow nozzle with a liquid collecting medium and, as the contaminated gases flow at high velocity through the orifices between and around the filter elements, the gases become wetted and the contaminants begin to collect within the liquid particles. The wetted gases move from the flow nozzle into the main housing of the dust collector at a reduced velocity and pass into a large multi-layer filter bed wherein the contaminants are collected in the liquid foam and droplets which are formed. These liquid droplets, containing large amounts of contaminants, are removed from the housing and the cleansed gases move on out of the housing. By prewetting the contaminated gas as it moves through the filter elements in the flow nozzle, increased collection efficiency is obtained in the collector because the gas and liquid medium is more intimately mixed and the liquid particles are more finely divided.

For a better understanding of the invention, reference should be had to the drawings, in which:

FIG. 1 is a vertical sectional view taken through a dust collector constructed in accordance with the present invention;

FIG. 2 is an enlarged fragmentary sectional view taken through the inlet flow nozzle of the dust collector of FIG. 1;

FIG. 3 is a transverse cross-sectional view taken substantially along line 3—3 of FIG. 2;

FIG. 4 is a fragmentary sectional view taken substantially along line 4—4 of FIG. 2;

FIG. 5 is a fragmentary view taken along line 5—5 of FIG. 4;

FIG. 6 is an enlarged top plan view looking downwardly in a direction of the arrows 6—6 of FIG. 4;

FIG. 7 is a view similar to FIG. 6 illustrating another embodiment of an inlet flow nozzle employing a different arrangement of spherical filter elements;

FIG. 8 is a top plan view, similar to FIG. 5, of the embodiment of FIG. 7; and

FIG. 9 is an enlarged fragmentary sectional view of another embodiment of the dust collector constructed in accordance with the invention.

Referring now, more particularly, to the drawings, therein is illustrated one embodiment of a wet scrubber type dust collector constructed in accordance with the present invention and referred to generally by the reference number 10. The dust collector 10 comprises an upright housing 12 which is supported on a plurality of legs or posts 14 and the contaminated gas to be cleaned is supplied to the lower end of the housing from a supply duct 16. The contaminated gas moves upwardly through the housing 12 for cleaning and scrubbing and, after cleaning, the gas is discharged from the upper end of the housing into an outlet or recirculation duct 18. The gas is moved through the dust collector 10 by means of a fan (not shown) which is connected to the supply or discharge duct systems associated with the collector or, if desired, a fan can be mounted in the housing 12 itself adjacent the upper end.

The housing 12 includes a lower inlet flow conduit or nozzle section 20, a flow transition section 22, a filter bed containing intermediate section 24 and an upper discharge section 26, and each of these sections is provided with an upper and lower end flange for facilitating a bolted, flanged connection between an adjacent section and with the supply duct 16. Suitable sealing gaskets 28 are provided between adjacent flanges on the housing sections and the upper end of the housing is closed with a removable top or cover plate 30.

The upper discharge section 26 is generally cylindrical and is connected with the outlet or recirculation duct 18 by means of a flanged outlet fitting 32 arranged to direct the upwardly moving, swirling gas stream in the discharge section tangentially outward into the outlet duct. The cleaned gas entering the lower end of the discharge section 26 usually contains small amounts of liquid in the form of droplets or very fine mist and, in order to remove this liquid from the gas, a demisting vane assembly or entrainment separator 34 is mounted in the lower end of the discharge section. Preferably, the entrainment separator 34 is of the type shown and described in the co-pending United States patent application Ser. No. 503,463, filed Oct. 23, 1965, and assigned to the same assignee as the present invention. These types of entrainment separators cause the upwardly moving gas to swirl and the liquid particles are centrifuged outwardly against the walls of the housing. For this purpose, the separator 34 includes a plurality of adjustable swirl vanes 36 arranged within an annular passage 38 formed between an outer liquid collecting trough or channel 40 adjacent the collector sidewall and an inner cylindrical ring 42 and circular baffle plate 44. In order to provide access within the discharge section 26 for adjustment and maintenance of the entrainment separator 34, an access opening 46 is formed in the side wall of the section above the separator and a removable cover or door 48 is provided to seal and close the access opening.

The intermediate section 24 is generally cylindrical with a circular cross section, and houses a main filter bed 50 which, preferably, comprises a plurality of spherical filter elements 52 arranged in a multiplicity of layers extending transversely across the intermediate section. The main filter bed 50 is supported on a framework 54 constructed of angle iron and a screen or porous tray 56 which rests upon the framework. The screen 56 permits the gases to flow upwardly through the opening therein into the filter bed 50 for further movement through the bed on the various diverse and tortuous paths defined therein between the individual filter elements 52. Preferably, the filter elements are formed of glass or stone spheres and are smoothly surfaced to reduce friction as the gases pass around and between the elements. The surfaces of the filter elements are wetted with a liquid collection medium, such as water, and the contaminant particles from the gas moving through the filter bed impinge and collect in the liquid film on these wetter surfaces.

As the gas moves through the multi-layered filter bed 50, the direction and velocity of flow changes rapidly and the impurities in the gas are separated out of the gas stream to collect on the wetted surfaces of the filter elements 52. Larger droplets of contaminant containing liquid are formed in the filter bed, and in the upper layers thereof an intense foaming action takes place wherein the liquid medium forms a myriad of small bubbles which provide an even greater surface area of liquid film exposed to the gas flow.

The intense foaming action in the upper layers of the filter bed 50 produces a foam bed adjacent the upper surface thereof and, in order to control and maintain the height of the foam bed and to remove the contaminated liquid collecting medium from the filter bed 50, a drain sump 58 is mounted in the filter bed adjacent the upper level thereof. Preferably, the sump 58 is centrally located in the housing and includes a screen 58a which helps to remove foam and bubbles from the liquid medium as it flows into the sump. The sump is connected to a primary drain line 60 which extends downwardly from the sump and outwardly through the housing sidewall to remove the collected liquid. The liquid collecting trough 40 of the entrainment separator 34 is connected with the outwardly extending position of the drain line 60 through a drain line 62 which extends downwardly from the bottom of the trough. The intermediate housing section 24 includes an access opening 64 in the sidewall thereof so that access may be had to service the main filter bed 50 or drain sump 58, and a removable access door 66 is provided to seal close this access opening.

The transition section 22 of the collector housing is connected to the lower end of the intermediate section 24, and this section 22 provides an expansion chamber for the gas flowing upwardly from the nozzle section 20. The upper end of the transition section 22 is circular in cross section 24, and the lower end is preferably square or rectangular in cross section, like the nozzle section 20. Accordingly, the walls of the transition section slope upward and outwardly from the lower end thereof to permit expansion of the gas flowing upwardly therethrough and a reduction in gas velocity from that present in the nozzle section 20.

The inlet flow nozzle section 20 comprises a tubular wall portion of relatively short length provided with an upper and lower peripheral end flange for interconnecting the nozzle section between the lower end of the transition section 22 and the flanged upper end of the inlet supply duct 16. The tubular wall of the nozzle section is rectangular or square in cross section (FIG. 3) and the cross-sectional area is considerably less than that of the housing sections 24 and 26. Accordingly, the average gas velocity through the nozzle section 20 is considerably greater than the average flow velocity through the upper sections of the housing and the pressure in the nozzle section is reduced in accordance with Bernoulli's principle.

In order to wet the gas as it flows upwardly into the collector housing, a pair of opposing liquid spray nozzles 68 and 70 are positioned above and below the nozzle section 20 to direct fine sprays of liquid droplets into the gas stream in both a concurrent and countercurrent direction relative to the direction of gas flow. A single layer 72 comprising a plurality of spherical filter elements 74 is mounted in the nozzle section to extend transversely across the section, generally normal to the direction of gas flow therein. The liquid spray from the nozzles 68 and 70 is directed upon the surfaces of the filter elements 74 which then become wetted with a thin liquid film. As the gas flows upwardly through the filter element layer 72, it comes in direct contact with the liquid film on the surfaces of the individual filter elements 74 and is thereby wetted. As illustrated in FIGS. 2, 3, and 6, the filter elements 74 are arranged to lie in a single layer 72 in side-by-side tangentially touching relation with one another. Accordingly, a plurality of open spaces or voids 76 are formed between adjacent filter elements, as shown in FIG. 6. The filter elements comprising the layer 72 are arranged to lie in parallel rows with the elements in one row staggered in relation to the elements in the adjacent rows on opposite sides thereof and, consequently, the spaces or voids 76 are somewhat triangular in cross section, as shown in FIG. 6. Each void or space 76 forms a venturi-type orifice or flow nozzle through which a gas stream passes, and the adjacent spherical surfaces of the filter elements 72 form the convergent and divergent walls of the orifices. The triangular areas 76 of FIG. 6 represent the minimum area portions of the nozzles or orifices between adjacent filter elements and, accordingly, the gas velocity is the greatest in this region. The total area of all the small triangular areas 76 is considerably less than the cross-sectional area of the nozzle section 20 and, accordingly, the gas velocity through these areas is considerably greater than the average gas velocity in the nozzle section.

From the foregoing, it is apparent that the gas first accelerates and then decelerates as it passes upwardly through the layer of filter elements 72 in the nozzle section 20 and, in addition to the changes in velocity, the flow direction changes considerably as the gas flows around and between the spherical surfaces of the filter elements. The surfaces of the filter elements are wetted continuously by the spray nozzles 68 and 70 and the gas passing around and between the filter elements is wetted thereby. The contaminant particles tend to collect in the moisture droplets that are picked up in the gas stream and, because of the rapid changes in gas velocity and flow direction in the region of the filter layer 72, a thorough and intimate mixing and atomization of the liquid in the gas is obtained. It has been found that by prewetting the contaminated gas in a high velocity nozzle section 20, as described, much higher overall collection efficiencies can be obtained in the dust collector 10 as compared to a collector wherein liquid is only sprayed or otherwise introduced into the main filter bed.

In order to support the layer of filter elements 72 in the nozzle section 20, a lower grid comprising a plurality of parallel grid rods 78 is mounted to extend transversely across the nozzle section between one pair of opposite parallel walls thereof. Preferably, the grid rods are constructed of a noncorrosive material, such as glass, rubber or plastic, and the rods extend through and are supported in spaced apart apertures or holes provided in the walls of the nozzle section. The rods can be removed by withdrawing them through the apertures and can be easily replaced in position after cleaning or the like. As shown in FIG. 4, the rods are arranged in a horizontal plane parallel to each other and are spaced to underlie the centers of the spherical filter elements 74 in each parallel row.

In order to prevent gas leakage around the perimeter of the nozzle section because of the large open spaces between the end of the filter elements in the staggered rows and the adjacent sidewalls of the section, a rectangular, annular shielding plate 80 is mounted upon the lower grid rods 78. As shown in FIG. 3, the shielding plate 80 includes a central opening, and the edges of the opening are centered along respective transverse rows of filter elements to eliminate gas leakage around the perimeter through large open areas, as at 82.

In order to prevent the filter elements 74 from moving upwardly and permanently leaving the layer 72, an upper grid comprising a plurality of rods 84 is mounted to extend transversely across the nozzle section 20 above the spherical element 74. The rods 84 are identical with the rods 78 and are positioned in vertical alignment with them. The rods 84 can be easily removed, as previously described, and, after removal, the individual filter elements 74 can be removed for cleaning or replacement. The upper grid rods 84 are spaced upwardly above the spherical filter elements 74 to permit slight vertical movement of the elements, which are somewhat loosely positioned within the layer 72 so the elements may freely rotate and bounce in the gas stream and provide a self-cleaning action. Because of the continuous rotation and movement of the filter elements, it is seldom necessary for the filter elements to be cleaned and, once they are placed in the layer 72 a long and useful service life is usually obtained. Because the spherical filter elements usually rotate and move continually as the gas streams pass around and in between the elements, the surfaces of the elements are fully wetted by the spray nozzles 68 and 70, and good wetting of the gas is insured.

Referring now to FIG. 1, the primary drain line 60, which drains liquid from the main filter bed 50 and the collecting trough 40 in the upper section 26 of the collector housing, extends outwardly of the housing sidewall to empty into a settlement chamber 86. Fresh or make-up water is supplied to the settlement chamber 86 through a supply pipe 88, and a float control valve 90 is provided to insure that the upper level of water within the settlement chamber is sufficient. The settlement chamber 86 includes a downwardly extending baffle **86*a* and an upwardly extending baffle 86*b* to aid in settling the contaminants out of the liquid as it enters the chamber from the line 60 and travels towards the right-hand end thereof. The baffle 86*b* forms a clear water sump adjacent the right-hand end of the settlement chamber, and water from this sump is directed through a liquid line 92 by a pump 94 to the nozzle 70 in the supply duct 16 for spraying on the underside of the filter elements 74 in the filter layer 72. A portion of the contaminated liquid in the primary drain line 60 does not go to the settlement chamber 86 but instead is diverted by a line 96 and proportioning pump 98 directly into the upper nozzle 68 for spraying downwardly on the filter layer 72. Because the nozzle 68 directs a liquid spray against the direction of gas flow and encounters the gas after it has already been wetted by the clean liquid from the lower nozzle 70**, it is not necessary that the contaminants be removed from the liquid supplied to the upper nozzle.

The contaminated gas flows through the inlet supply duct 16 and is directed upwardly into the nozzle section 20 wherein the gas strikes the wetted filter elements 74 of the layer 72. The spray nozzles 68 and 70 supply the liquid medium for continually wetting the surfaces of the filter elements 74, and the gas passing between and around the elements is continually wetted and picks up moisture in the form of finely divided mist or liquid particles. Because the gas flow is turbulent through the filter layer 72, the contaminant particles are intimately mixed with the liquid droplets and collect therein. The wetted gas moves upwardly from the nozzle section 20 into the transition section 22, and the gas velocity is decreased as the gas expands in the increasing cross-sectional area of the transition section. During the expansion and reduction in gas velocity, a complete and thorough mixing of the liquid droplets and the gas is obtained and many contaminant particles become entrapped within the liquid droplets. As the gas passes up into the main filter bed 50, the surfaces of the filter elements 52 become wetted with liquid film and an intense foaming and cleaning action takes place. The liquid droplets with the entrapped contaminants therein begin to enlarge and move upwardly toward the upper layers of the filter bed. A region of intense bubbling or foaming action is formed adjacent the upper layers of the main filter bed 50 and the gas passes through a bed of foam or bubbles formed adjacent the upper surface of the filter bed and most of the contaminants in the gas are collected in the liquid droplets. The liquid droplets containing large quantities of contaminants are drained off through the drain sump 58 and flow down the drain line 60. A portion of the liquid is pumped through the line 96 by the proportioning pump 98 directly into the spray nozzle 68 and is again introduced into the gas flow. A larger portion of the liquid flowing down the drain line 60 passes into the settlement chamber 86 where the contaminants or impurities settle out, aided by the action of the baffles 86a and 86b.

As the gas leaves the filter bed 50 and foam bed thereon, most of the contaminants have been removed; however, the gas may contain small amounts of liquid in the form of minute droplets or fine mist. These droplets or mist are removed in the entrainment separator 34 in the manner described in greater detail in the aforementioned copending patent application, and the cleansed gas then moves on upwardly and out through the outlet fitting 32 into the redistribution or recirculation duct 18. The liquid removed by the entrainment separator 34 flows down the drain line 62 into the primary drain line 60.

The dust collector 10 of the present invention has an extremely high collection efficiency over a wide range of particle sizes, even down to particle sizes of less than one micron. By wetting the gases during high velocity flow through the filter layer 72 in the nozzle section 20, increased collecting efficiencies are obtained in the main filter bed 50. The venturi action of the gas flowing around and between the spherical elements 74 increases the atomization of the water that is picked up by the contaminated gas stream. In FIGS. 7 and 8 there is illustrated another arrangement wherein a double layer 172 of spherical filter elements 174 is utilized in a nozzle section 20. In this arrangement, a lower layer of spherical filter elements 174 is arranged in parallel rows but the elements of adjacent rows are not staggered, as in the previous embodiment. Accordingly, voids or spaces 176 in between adjacent elements are square rather than triangular, as are the voids 76 of the previous embodiment. The voids 176 are somewhat larger in area than the voids 76, so the gas velocity therethrough is somewhat less. Above each of the square voids 176 in the lower layer is centered a spherical filter element 174 of a second or upper layer of filter elements. As each gas stream moves upwardly through a void or space 176 in the lower layer, the stream is split into four diverse part streams which unite with other part streams to pass through voids 176 formed in the second layer of filter elements. The splitting up of the streams into part streams and re-uniting of the part streams provide a thorough and intense mixing action between the liquid droplets and the gas so that good distribution of very fine liquid particles throughout the gas streams is obtained.

Referring now to FIG. 9, there is illustrated another embodiment of a nozzle section 220 adapted for use with a wet scrubber type dust collector. The nozzle section 220 is somewhat longer than the nozzle section 20, previously described, in order that there may be employed a pair of spaced apart single layers of filter elements 272. An upper single layer 272a is spaced above a lower layer 272 and, preferably, the layers are identical with one another and with the filter layer 72 and associated components previously described. Preferably, the spray nozzle 68 is positioned between the spaced layers 272 and 272a and directs a spray of liquid on the upper surfaces of the filter elements 274 in the lower layer 272. Spray nozzles are not required to wet the upper filter layer 272a because the gas passing upwardly through the lower layer 272 becomes wetted and, as it reaches the upper layer 272a, it wets the surfaces of the spherical elements 274 therein. This action provides a thorough mixing of the gas and the liquid droplets and, as the gas moves upwardly through the voids between the spherical elements 274a in the upper layer 272a, many of the contaminants are collected in the liquid droplets carried by the gas. The arrangement shown in FIG. 9 thus employs a pair of spaced apart, single layers of filter elements rather than a unitary single layer, as shown in the embodiment of FIGS. 1 through 6. The embodiment of FIGS. 7 and 8 employs two layers of filter elements, one imposed directly above and touching the filter elements of a lower layer. It is also within the scope of the invention to position the nozzle 68 to direct its spray upwardly against the lower surfaces of the spheres 274a and the upper filter layer 272a, and the spray nozzle 68 could be positioned above the upper layer 272a to direct its spray downwardly onto the spherical filter elements therein.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In a dust collector for removing contaminants from gas, the combination including a flow nozzle for said gas forming a part of said collector and having a smaller cross section than an adjacent downstream portion of said collector, a plurality of spherical filter elements arranged to lie in a single layer extending across said nozzle and generally transversely of the direction of gas flow therein, said filter elements arranged in said layer to lie in side-by-side, freely rotatable, tangential relation with one another thereby forming a multiplicity of small gas flow orifices between adjacent filter elements, first grid means underlying said layer and extending across said flow nozzle for supporting said filter elements, second grid means overlying said layer and spaced above said filter elements therein by a distance sufficient to permit limited movement of said elements but prevent permanent displacement of said elements out of said layer, and spray means for wetting the undersurfaces of said spherical elements in order to collect contaminants from said gas flow impinging thereon.

2. The combination of claim 1 wherein said first and second grid means each includes a plurality of parallel rods detachably mounted to extend through said flow nozzle, each of said rods positioned in co-planar alignment with the centers of a plurality of spherical elements in said layer.

3. The apparatus of claim 1 including a second single layer of spherical filter elements in said flow nozzle means parallel to and spaced from said first mentioned layer, grid means for supporting said second layer of filter elements and including means spaced above said second layer by a distance sufficient to permit limited movement of said elements and prevent the permanent displacement of elements out of said second layer, said spray means positioned to discharge a spray of liquid to wet said filter elements between said layers in said fluid nozzle.

4. The apparatus of claim 1 wherein said spray means includes a nozzle disposed above said layer of filter elements to direct liquid spray onto said spherical elements in a direction counter to the gas flow through said nozzle.

5. A dust collector for removing contaminants from gas, comprising an upright housing, a filter bed extending transversely across said housing, flow nozzle means below said filter bed for accelerating said gas and disposed to discharge said gas upwardly toward said filter bed, said flow nozzle means including a plurality of spherical filter elements arranged in a single layer extending transversely of the direction of gas flow therein, said layer being substantially smaller in area than the area of said filter bed, said filter elements arranged in said layer to lie in side-by-side, freely rotatable, tangential relation with one another, thereby forming a multiplicity of small gas flow orifices between adjacent filter elements, first grid means underlying said layer and extending across said nozzle means for supporting said filter elements, second grid means overlying said layer and spaced above said filter elements therein by a distance sufficient to permit limited movement of said elements away from said first grid means and prevent permanent displacement of said elements out of said layer, and spray means for wetting the undersurfaces of said spherical elements in order to collect contaminants from said gas flow impinging thereon.

6. The apparatus of claim 5 wherein said housing includes a tapered section portion expanding in cross section between said flow nozzle and said filter bed.

7. The combination of claim 5 wherein said first and second grid means each includes a plurality of parallel rods detachably mounted to extend across said nozzle means, each of said rods positioned in co-planar alignment with the centers of a plurality of spherical elements in said layer.

8. The combination of claim 5 and means adjacent the upper level of said filter bed for collecting contaminated liquid and directing said liquid to said spray means.

References Cited

UNITED STATES PATENTS

| | | | |
|---|---|---|---|
| 999,320 | 8/1911 | Kyll | 261—114 |
| 2,253,261 | 8/1941 | Bacon | 261—94 |
| 2,560,635 | 7/1951 | Conyers | 261—98 X |
| 2,645,304 | 7/1953 | McIlvaine | 261—95 X |
| 2,691,423 | 10/1954 | McIlvaine | 55—233 X |
| 2,888,091 | 5/1959 | Katz | 261—95 X |
| 3,122,594 | 2/1964 | Kielback | 261—94 |
| 3,181,287 | 5/1965 | Rabson | 261—108 X |
| 3,210,914 | 10/1965 | Eckert. | |

FOREIGN PATENTS

| | | |
|---|---|---|
| 234,911 | 6/1924 | Germany. |
| 956,858 | 4/1964 | Great Britain. |
| 983,670 | 2/1965 | Great Britain. |

OTHER REFERENCES

"Tower Packings," Bulletin tp 54 of the U.S. Stoneware Co., Akron, Ohio, Copyright 1957. Pages 16 and 17 relied on.

HARRY B. THORNTON, *Primary Examiner.*

TIM R. MILES, *Examiner.*